(12) United States Patent
Schickler et al.

(10) Patent No.: US 11,708,808 B2
(45) Date of Patent: Jul. 25, 2023

(54) SYSTEMS AND METHODS FOR TREATED EXHAUST GAS RECIRCULATION IN INTERNAL COMBUSTION ENGINES

(71) Applicant: SPI.SYSTEMS CORPORATION, Webster, NY (US)

(72) Inventors: John Francis Schickler, Webster, NY (US); Andrew R. Komarek, Fairport, NY (US); Richard Hugh Scott, Jr., Canandaigua, NY (US); James J. Carello, Canandaigua, NY (US)

(73) Assignee: SPI.SYSTEMS CORPORATION, Rochester, NY (US)

( * ) Notice: Subject to any disclaimer, the term of this patent is extended or adjusted under 35 U.S.C. 154(b) by 0 days.

(21) Appl. No.: 17/867,145

(22) Filed: Jul. 18, 2022

(65) Prior Publication Data

US 2022/0349366 A1 Nov. 3, 2022

Related U.S. Application Data

(63) Continuation of application No. 17/431,092, filed as application No. PCT/US2020/027149 on Apr. 8, 2020, now Pat. No. 11,391,251.

(Continued)

(51) Int. Cl.
*F02M 26/35* (2016.01)
*F02M 26/04* (2016.01)
(Continued)

(52) U.S. Cl.
CPC ............ *F02M 26/35* (2016.02); *F01N 3/021* (2013.01); *F01N 3/103* (2013.01); *F01N 3/2066* (2013.01);
(Continued)

(58) Field of Classification Search
CPC ........ F02M 26/35; F02M 26/04; F02M 26/14; F02M 26/15; F02M 26/17; F02M 26/45;
(Continued)

(56) References Cited

U.S. PATENT DOCUMENTS

| 5,443,547 A | 8/1995 | Morikawa |
| 5,771,868 A | 6/1998 | Khair |

(Continued)

FOREIGN PATENT DOCUMENTS

| EP | 2151570 A1 | 2/2010 |
| EP | 2264298 A1 | 12/2010 |

(Continued)

OTHER PUBLICATIONS

Japanese Patent Office; Final Office Action; Application No. 2021-560568; dated Nov. 8, 2022; 7 Pages.

(Continued)

*Primary Examiner* — Brandon D Lee
(74) *Attorney, Agent, or Firm* — Barclay Damon LLP (57) ABSTRACT

Systems and methods for treated exhaust gas recirculation (EGR) for an internal combustion engine are disclosed. The internal combustion engine has an exhaust manifold discharging exhaust gas and an intake manifold receiving forced air from a compressor. One or more exhaust treatment devices treat the exhaust gas and produce a treated exhaust gas. The EGR system includes an EGR line downstream of the one or more exhaust treatment devices and connected to the engine intake line downstream of the compressor, wherein the treated EGR line recirculates the treated exhaust gas to the intake manifold of the engine without passing through the compressor.

3 Claims, 6 Drawing Sheets

Related U.S. Application Data (60) Provisional application No. 62/965,782, filed on Jan. 24, 2020, provisional application No. 62/879,524, filed on Jul. 28, 2019, provisional application No. 62/831,133, filed on Apr. 8, 2019.

(51) Int. Cl.
| | |
|---|---|
| *F02M 26/14* | (2016.01) |
| *F02M 26/17* | (2016.01) |
| *F02M 26/45* | (2016.01) |
| *F02M 26/65* | (2016.01) |
| *F01N 3/021* | (2006.01) |
| *F01N 3/10* | (2006.01) |
| *F01N 3/20* | (2006.01) |
| *F02D 41/00* | (2006.01) |
| *F02M 35/10* | (2006.01) |
| *F02M 26/15* | (2016.01) |

(52) U.S. Cl.
CPC ......... *F02D 41/0077* (2013.01); *F02M 26/04* (2016.02); *F02M 26/14* (2016.02); *F02M 26/15* (2016.02); *F02M 26/17* (2016.02); *F02M 26/45* (2016.02); *F02M 26/65* (2016.02); *F02M 35/10157* (2013.01)

(58) Field of Classification Search
CPC .. F02M 26/65; F02M 35/10157; F02M 26/05; F02M 26/10; F02M 26/42; F02M 26/46; F02M 26/07; F01N 3/021; F01N 3/103; F01N 3/2066; F02D 41/0077; Y02T 10/12
See application file for complete search history.

(56) References Cited

U.S. PATENT DOCUMENTS

| | | | |
|---|---|---|---|
| 6,009,704 A | 1/2000 | Feucht | |
| 6,216,458 B1* | 4/2001 | Alger | F02M 26/05 60/605.2 |
| 6,301,887 B1 | 10/2001 | Gorel et al. | |
| 6,427,436 B1 | 8/2002 | Allansson et al. | |
| 6,742,335 B2 | 6/2004 | Beck et al. | |
| 6,925,992 B1 | 8/2005 | Ericksson et al. | |
| 7,017,560 B2 | 3/2006 | Eriksson et al. | |
| 8,381,520 B2 | 2/2013 | Leroux et al. | |
| 8,561,645 B2 | 10/2013 | Leroux et al. | |
| 8,914,221 B2 | 12/2014 | Peters et al. | |
| 9,145,854 B2 | 9/2015 | Hodebourg et al. | |
| 2008/0098723 A1 | 5/2008 | Carlill | |
| 2010/0294252 A1 | 11/2010 | Katoh et al. | |
| 2011/0048004 A1 | 3/2011 | Leroux et al. | |
| 2011/0061380 A1 | 3/2011 | Leroux et al. | |
| 2011/0114211 A1 | 5/2011 | Leroux et al. | |
| 2011/0162360 A1* | 7/2011 | Vaught | F02B 33/44 60/605.2 |
| 2014/0020361 A1* | 1/2014 | Warey | F02M 26/35 60/273 |
| 2014/0318514 A1* | 10/2014 | Pursifull | F02D 41/005 123/568.29 |
| 2016/0177887 A1 | 6/2016 | Fischer | |

FOREIGN PATENT DOCUMENTS

| | | |
|---|---|---|
| GB | 245 9694 A | 11/2009 |
| GB | 2492994 A | 1/2013 |
| JP | 2003505642 A | 2/2001 |
| JP | 2002256862 A | 11/2002 |
| JP | 210196618 A | 9/2010 |
| JP | 2013170455 A | 2/2013 |
| JP | 2013253533 A | 12/2013 |
| JP | 2014034956 A | 2/2014 |
| WO | 98/55759 A1 | 12/1998 |
| WO | 02/081897 A1 | 10/2002 |
| WO | 2009/106725 A1 | 9/2009 |
| WO | 2009/106726 A1 | 9/2009 |
| WO | 2010123411 A1 | 10/2010 |

OTHER PUBLICATIONS

Yan Chang et al.; "Catalytic Exhaust Gas Recirculation-Loop Reforming for High Efficiency in a Stoichiometric Spark-Ignited Engine through Thermochemical Recuperation and Dilution Limit Extension, Part 1: Catalyst Performance"; Energy Fuels 2018, 32, 2245-2256; Dec. 19, 2017; ACS Publications (12 pages).

Yan Chang et al.; "Catalytic Exhaust Gas Recirculation-Loop Reforming for High Efficiency in a Stoichiometric Spark-Ignited Engine through Thermochemical Recuperation and Dilution Limit Extension, Part 2: Engine Performance"; Energy Fuels 2018, 32, 2257-2266; Dec. 19, 2017; ACS Publications (10 pages).

Jeffrey Hwang et al.; "Exploration of Dual Fuel Diesel Engine Operation with on-Board Fuel Reforming"; SAS Technical Paper 2017-01-0757, doi: 10.4271/2017-01-0757; Mar. 3, 2017; SAE International (9 pages).

International Searching Authority, International Search Report and Written Opinion, dated Jul. 15, 2020, (8 pages).

European Patent Office; Extended European Search Report; Application No. 20788322.4; Date of Completion of Search: Nov. 10, 2022; dated Nov. 22, 2022; 8 Pages.

* cited by examiner

SYSTEMS AND METHODS FOR TREATED EXHAUST GAS RECIRCULATION IN INTERNAL COMBUSTION ENGINES

CROSS-REFERENCE TO RELATED APPLICATIONS

This application is a continuation of U.S. patent Ser. No. 17/431,092 filed on Aug. 13, 2021, which is a National Application of International Application No. PCT/US20/27149, filed on Apr. 8, 2020, which claims the benefit and priority of U.S. Provisional Patent Application Nos. (i) 62/831,133, filed Apr. 8, 2019, and entitled METHODS OF CALIBRATED STEAM SELF-HUMIDIFICATION OF ENGINE COMBUSTION, (ii) 62/879,524, filed Jul. 28, 2019, and entitled METHOD OF CALIBRATING INTERNAL COMBUSTION ENGINE PERFORMANCE, and (iii) 62/965,782, filed Jan. 24, 2020, and entitled A METHOD FOR IMPROVING DIESEL COMBUSTION THROUGH REINTRODUCTION OF EXHAUST GASES, the entirety of each is incorporated herein by reference.

TECHNOLOGICAL FIELD

This subject matter disclosed herein relates to systems and methods for treated exhaust gas recirculation (treated EGR) in internal combustion engines to improve engine performance, where at least a portion of the exhaust gas from the engine exhaust manifold is recycled directly to the engine intake manifold after undergoing treatment and without compression of the exhaust gas.

BACKGROUND

Internal combustion engines can be used with a number of different types of fuels. The combustion converts the chemical energy of the fuel into mechanical energy and also produces a number of emission byproducts that can cause environmental pollution, including carbon-based particulates (e.g., soot) and nitrogen oxide (NOx). In order to reduce environmental pollution, regulatory agencies have adopted emission standards for combustion engines requiring reduced engine emissions.

Figure 1:
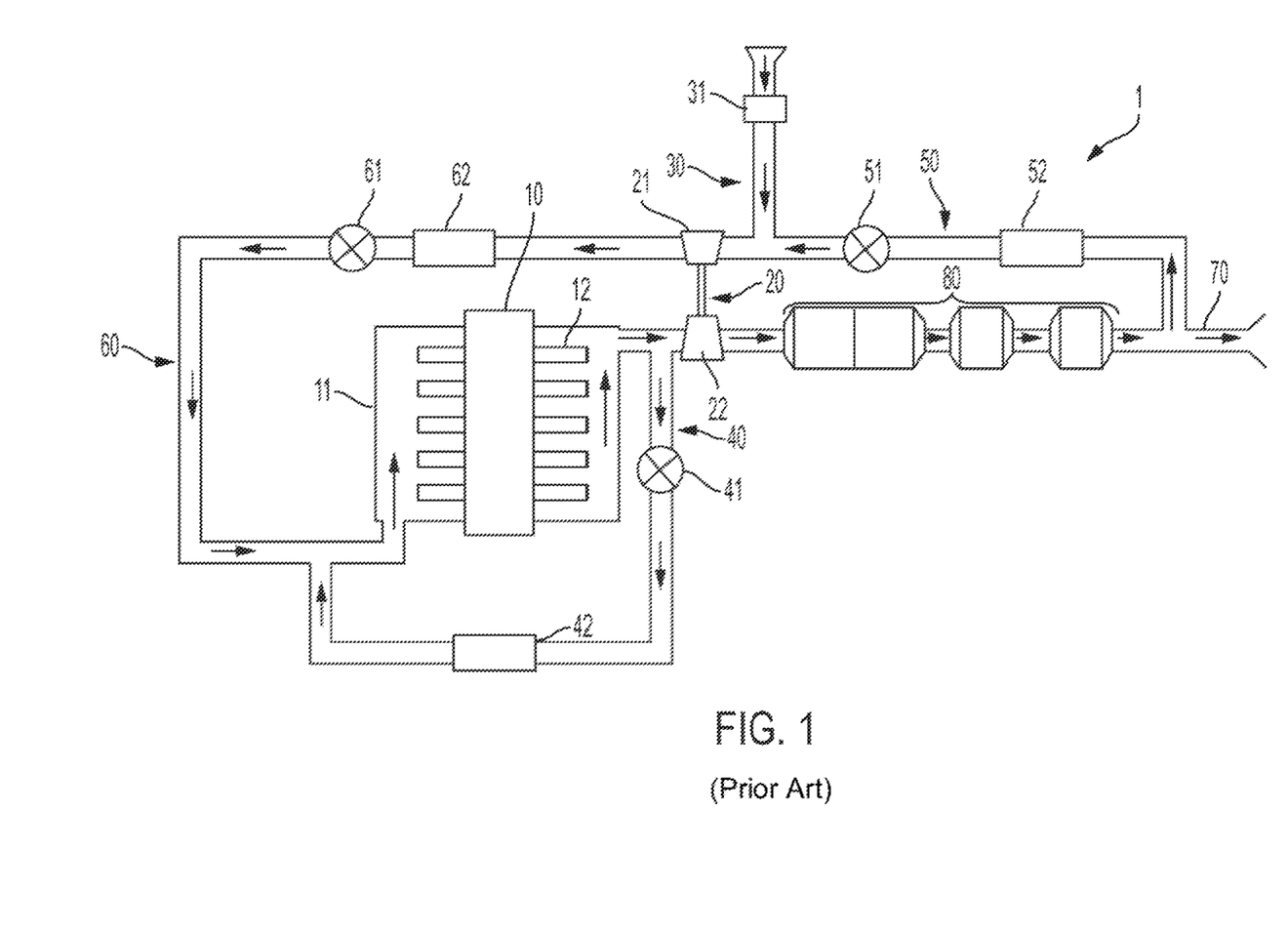
FIG. 1 illustrates a prior art treated EGR system.

In response to these emission regulations, engine manufacturers developed techniques for treating the exhaust gases flowing from the engine and before the exhaust gases are released into the atmosphere. FIG. 1 illustrates a prior art exhaust gas recirculation (EGR) system 1 in an internal combustion engine (e.g., a diesel engine) 10 to reduce emissions. For example, an air intake system (e.g., an air intake line 30 and air intake filter 31) upstream of the compressor 21 of a turbocharger 20 provides a supply of fresh or atmospheric intake air to the inlet of the compressor 21. That intake air is compressed, heated in the compressor 21 of the turbocharger 20 and flows from the outlet of the compressor 21 downstream of the compressor 21 through engine intake line 60, including the intake line cooler 62, the intake line (throttle) valve 61, and to the intake manifold 11 of the engine 10, which is provided with a supply of fuel (e.g., hydrocarbon $C_{15}H_{32}$).

Before the exhaust gas exiting the exhaust manifold 12 of the engine 10 reaches the inlet of the turbine 22 of the turbocharger 20 (i.e., is still upstream of the turbine 22), a first portion of the exhaust gas flows back through a pre-turbine EGR line 40 through a pre-turbine EGR line valve 41 and a pre-turbine EGR line cooler 42 to the intake manifold 11 of the engine 10. For example, the pre-turbine EGR line 40 can connect with the engine intake line 60 in a T-connection. Since the pressure in the exhaust manifold 12 of the engine 10 and the pre-turbine EGR line 40 upstream of the turbine 22 of the turbocharger 20 is typically greater than the pressure in the intake manifold 11 of the engine 10, the pre-turbine EGR system can be referred to as a high pressure (HP) EGR loop.

As shown in FIG. 1, the second portion of the exhaust gas exiting the exhaust manifold 12 of the engine 10 flows through the inlet of the turbine 22 of a turbocharger 20 and drives the turbine 22 to rotate the compressor 21. The exhaust gas exiting from the turbine 22 of the turbocharger 20 downstream of the turbine 22 is routed through exhaust treatment devices 80, including catalysts and filters, to reduce NOx, particulate, and other undesirable emissions.

While a first portion of the treated exhaust gas flows out to the atmosphere through, e.g., a tailpipe 70 (or muffler, e.g., of a vehicle) located downstream of the exhaust treatment devices 80, a second portion of the treated exhaust gas flows back through a treated EGR line 50, including a treated EGR line cooler 52 and treated EGR line valve 51. Since the pressure in the treated EGR line 50 is typically less than the pressure in the intake manifold 11 of the engine 10, the treated EGR system can be referred to as a low pressure (LP) EGR loop. To address this low pressure, the treated exhaust gas in the treated EGR line 50 is connected to the air intake line 30 in a T-connection and both lines 30, 50 are connected upstream of, and to, the inlet of the compressor 21 of the turbocharger 20, which compresses, heats the mixture of the intake air and treated exhaust gas that flows from the outlet of the compressor 21 downstream of the compressor 21 through the engine intake line cooler 62 and intake line (throttle) valve 61 to the intake manifold 11 of the engine 10.

While pre-turbine and treated EGR systems have been effective in reducing emissions, they also can have negative impacts on engine performance, including increased fuel consumption and reduced turbocharger performance.

SUMMARY

Systems and methods for exhaust gas recirculation (EGR) in internal combustion engines are disclosed that not only address emissions requirements, but also improve engine performance. The internal combustion engine has an exhaust manifold discharging exhaust gas and an intake manifold receiving forced air from a compressor. One or more exhaust treatment devices treat the exhaust gas and produce a treated exhaust gas. The EGR system includes an EGR line downstream of the one or more exhaust treatment devices and connected to the engine intake line downstream of the compressor, wherein the treated EGR line recirculates the treated exhaust gas to the intake manifold of the engine without passing through the compressor.

In one embodiment, the internal combustion engine has an exhaust manifold discharging exhaust gas to a turbine of a turbocharger located downstream of the engine and an intake manifold connected to an engine intake line receiving forced air downstream of a compressor of the turbocharger. One or more exhaust treatment devices are located downstream of the turbine for treating the exhaust gas and producing a treated exhaust gas. The EGR system comprises a treated EGR line with a first end connected to a point downstream of the one or more exhaust treatment devices and a second end connected to the engine intake line downstream of the compressor of the turbocharger. The first treated EGR line recirculates the treated exhaust gas to the intake manifold of the engine without passing through the compressor. In doing so, the beneficial constituents of the treated exhaust gas are preserved during recirculation and improve combustion.

In another embodiment, a pre-turbine EGR line with a first end connected to a point downstream of the exhaust manifold of the engine and upstream of the turbine of the turbocharger and a second end is connected to the engine intake line downstream of the compressor of the turbocharger. One or more exhaust treatment devices are located in the pre-turbine EGR line for treating the exhaust gas and producing a treated exhaust gas. The pre-turbine EGR line recirculates the treated exhaust gas to the intake manifold of the engine without passing through the compressor. Once again, in doing so, the beneficial constituents of the treated exhaust gas are preserved during recirculation and improve combustion.

In another embodiment, a method for EGR is disclosed. The method includes the steps of forcing air into the intake manifold of the engine connected to an engine intake line downstream of a compressor of a turbocharger; discharging exhaust gas from an exhaust manifold of the engine to a turbine of the turbocharger located downstream of the engine; treating the exhaust gas by one or more exhaust treatment devices located downstream of the turbine to produce a treated exhaust gas; and recirculating the treated exhaust gas through a treated EGR line with a first end connected to a point downstream of the one or more exhaust treatment devices and a second end connected to the engine intake line downstream of the compressor of the turbocharger without passing through the compressor. Once again, in doing so, the beneficial constituents of the treated exhaust gas are preserved during recirculation and improve combustion.

The above embodiments are exemplary only. Other embodiments are within the scope of the disclosed subject matter.

BRIEF DESCRIPTION OF DRAWINGS

A more particular description of the invention briefly summarized above may be had by reference to the embodiments, some of which are illustrated in the accompanying drawings. It is to be noted, however, that the appended drawings illustrate only typical embodiments of this invention and are therefore not to be considered limiting of its scope, for the invention may admit to other equally effective embodiments. Thus, for further understanding of the nature and objects of the invention, references can be made to the following detailed description, read in connection with the drawings in which.

DETAILED DESCRIPTION

The following detailed description refers to the accompanying drawings. Whenever possible, the same reference numbers are used in the drawings and the following description to refer to the same or similar elements. It will be understood that the herein described systems and methods are examples that embody certain inventive concepts as detailed herein. To that end, other variations and modifications will be readily apparent to those of ordinary skill in the art.

Systems and methods for exhaust gas recirculation (EGR) in internal combustion engines are disclosed that not only address emissions requirements, but also improve engine performance. The applicants have discovered that treatments of exhaust gas with, e.g., catalysts, produce certain constituents in the treated exhaust gas (e.g., Reactive Oxygen Species (ROS)) that alone or in combination that can enhance engine performance. Reactive oxygen species are chemically reactive chemical species containing oxygen, include singlet oxygen, hydroxyl radicals, and hydrogen peroxide.

When one or more of those reactive constituents in the treated exhaust gas are promptly recirculated to the engine intake manifold in a manner that eliminates or minimizes compression of the treated exhaust gas, engine performance is improved.

It will be understood that the invention can be used with turbocharged and non-turbocharged engines (e.g., compression ignited (diesel) or spark ignited (gasoline)) and can be used with engines that operate with different fuel types, including diesel, gasoline, natural gas, ethanol, hydrogen, propane, butane, and other suitable fuel types and air/fuel mixtures. Such engines can be used to power, a variety of applications (e.g., motor vehicles, construction equipment, mining equipment, ships, etc.)

Figure 2:
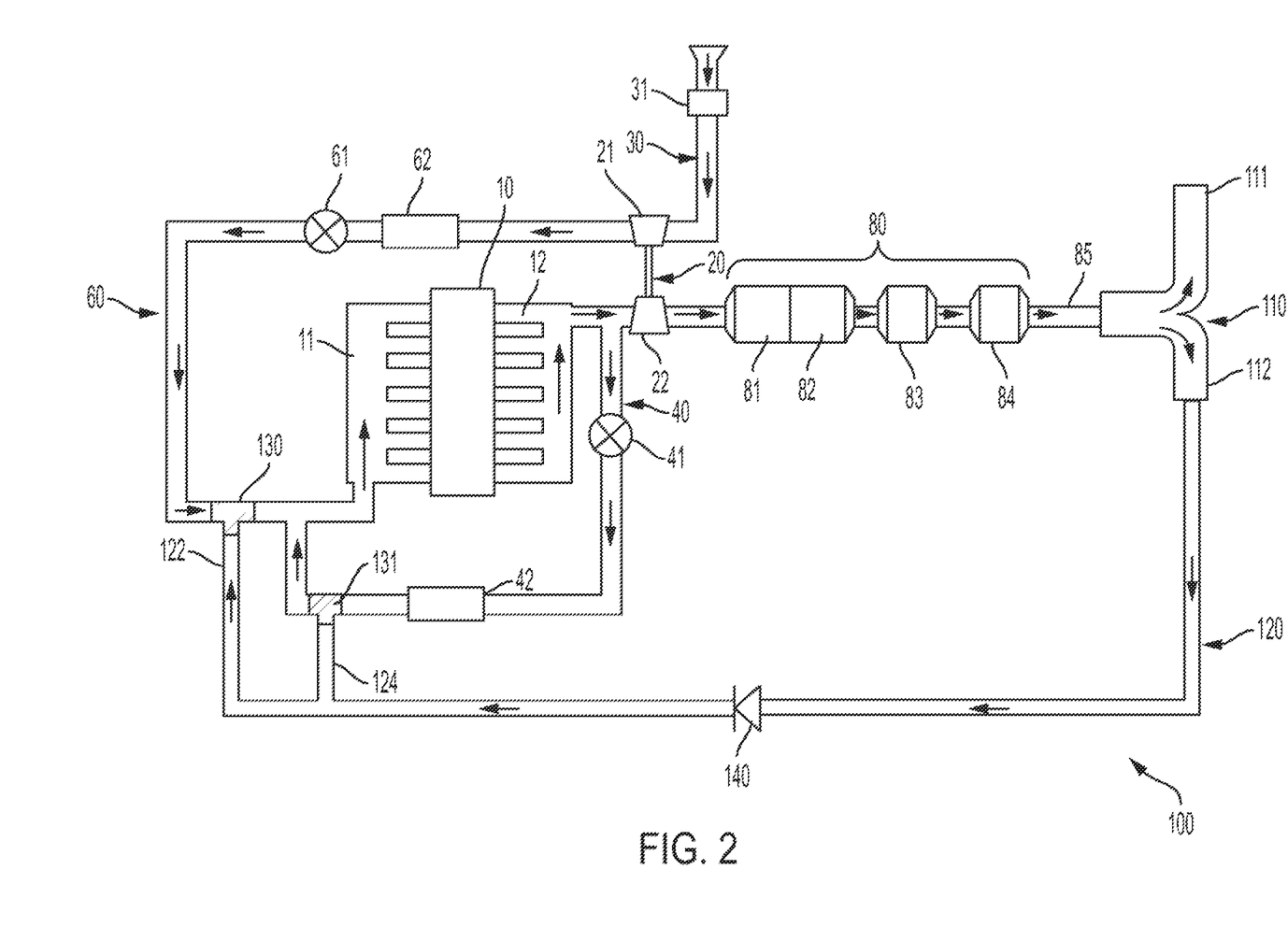
FIG. 2 illustrates a first embodiment of a treated EGR system recirculating treated exhaust gas from a point downstream of the turbine of the turbocharger and the exhaust treatment devices to a point downstream of the compressor of the turbocharger and into the intake manifold of the engine.

FIG. 2 illustrates a first embodiment of a treated EGR system 100 recirculating treated exhaust gas from a point downstream of the turbine 22 of the turbocharger 20 and the exhaust treatment devices 80 to a point downstream of the compressor 21 of the turbocharger 20 and into the intake manifold 11 of the engine 10. The turbocharger 20 in this forced induction system can include a compressor 21 that can include a fixed-geometry type compressor, a variable geometry compressor, or any other compressor known in the art. Similar to the prior art EGR system 1 illustrated in FIG. 1, in the treated EGR system 100 illustrated in FIG. 2, the air intake system (e.g., an air intake line 30 and air intake filter 31) upstream of the compressor 21 of the turbocharger 20 provides a supply of fresh or atmospheric intake air (including oxygen ($O_2$)) to the inlet of the compressor 21. That intake air is compressed, heated in the compressor 21 of the turbocharger 20 and flows from the outlet of the compressor 21 downstream of the compressor 21 through engine intake line 60, including the intake line cooler 62, the intake line (throttle) valve 61, and to the intake manifold 11 of the engine 10, which is provided with a supply of fuel (e.g., hydrocarbon $C_{15}H_{32}$).

Also similar to the prior art EGR system 1 illustrated in FIG. 1, in the treated EGR system 100 illustrated in FIG. 2, before the exhaust gas exiting the exhaust manifold 12 of the engine 10 reaches the inlet of the turbine 22 of the turbocharger 20 (i.e., is still upstream of the turbine 22), a first portion of the exhaust gas flows back through a pre-turbine EGR line 40 through a pre-turbine EGR line valve 41 and a pre-turbine EGR line cooler 42 to the intake manifold 11 of the engine 10. Since the pressure in the exhaust manifold 12 of the engine 10 and the pre-turbine EGR line 40 upstream of the turbine 22 of the turbocharger 20 is typically greater than the pressure in the intake manifold 1I of the engine 10, the pre-turbine EGR system can be referred to as a HP EGR loop. It will be understood that the first embodiment of the treated EGR system 100 illustrated in FIG. 2 can be provided with or without the HP EGR loop (e.g., for a retrofit of an existing EGR system).

As shown in FIG. 2, the second portion of the exhaust gas exiting the exhaust manifold 12 of the engine 10 flows through the inlet of the turbine 22 of the turbocharger 20 and drives the turbine 22 to rotate the compressor 21. This exhaust gas produced by the combustion of the hydrocarbons ($C_{15}H_{32}$) from the supplied fuel and the oxygen ($O_2$) from the fresh air intake, includes carbon dioxide ($CO_2$), carbon monoxide (CO), nitrous oxide (NOx), particulate matter (PM) (e.g., soot), unburned hydrocarbons (HC), oxygen ($O_2$), and moisture ($H_2O$) in the form of steam. The exhaust gas exiting from the turbine 22 of the turbocharger 20 downstream of the turbine 22 is routed through exhaust treatment devices 80, including catalysts and filters, to reduce undesirable emissions, before it is discharged to the outlet 85 of the exhaust treatment devices 80 For example, the treatment of the exhaust gases can include the use of a diesel particulate filter (DPF) 82 downstream of the exhaust manifold 12 of the engine 10 and the turbine 22 of the turbocharger 20 to remove PM from the exhaust gas. In some designs, an oxidation catalyst, such as a diesel oxidation catalyst (DOC) 81, can be located upstream of the DPF 82 and used to oxidize and remove HC and CO in the exhaust gas before the exhaust gas reaches the DPF 82. In other designs, a selective catalytic reduction catalyst (SCR) 83 can also be located downstream of the DPF and employ a reductant source (e.g., Diesel Exhaust Fluid (DEF)) that sets off a chemical reaction that converts NOx into nitrogen ($N_2$), and water that can be safely released into the atmosphere. In still other embodiments, an ammonia oxidation catalyst (AOC) 84 can be used downstream of the SCR 83 to reduce $NH_3$ emissions. It is understood that exhaust treatment devices 80 may be in different order and type, including a diesel reduction catalyst. It is understood in the art that the goal of the various catalysts and filters is to produce exhaust gas with decreased PM, HC, and NOx, where the treated exhaust gas includes $O_2$, moisture in the form of steam ($H_2O$), and inert $CO_2$ that are safe for the atmosphere.

As mentioned above, the applicants have discovered that these treating exhaust gas with, at least one e.g., of these oxidation or reduction catalysts and/or filters, produce certain reactive constituents (e.g., ROS and others) in the treated exhaust gas that can enhance engine performance when one or more of those constituents in the treated exhaust gas are promptly recirculated to the engine intake manifold in a manner that preserves activity.

In the prior art EGR system 1 illustrated in FIG. 1, a portion of the treated exhaust gas (including the constituents that can improve engine performance) flows back through a treated EGR line 50 that is connected to the inlet of the compressor 21, which compresses, heats the mixture of the intake air and treated exhaust gas that flows from the outlet of the compressor 21 downstream of the compressor 21 through engine intake line 60, including the engine intake line cooler 62, to the intake manifold 11 of the engine 10. Since the treated exhaust gas is recirculated through the compressor 21 of the turbocharger 20 and through the intake line cooler 62, by the time the treated exhaust gas reaches the intake manifold 11 and engine 10, most if not all of the advantageous and unstable constituents (e.g., ROS) in the treated exhaust gas are no longer present (e.g., the highly unstable ROS would have bonded together to form more stabilized molecules such as diatomic oxygen ($O_2$)). As will be explained, unlike in the prior art EGR system 1, in the first embodiment of the treated EGR system 100 illustrated in FIG. 2, the treated exhaust gas is recirculated to the intake manifold 11 of engine 10 without passing through the compressor 21 of the turbocharger 20 of the intake line cooler 62 to preserve the beneficial constituents (e.g., ROS) of the treated exhaust gas.

Returning to the treated EGR system 100 of FIG. 2, rather than recirculate the treated exhaust gas through the compressor 21 and engine intake line cooler 62, the treated exhaust gas flows downstream from the outlet 85 of the exhaust treatment devices 80 to the inlet of a Y-pipe 110 (or similar device (e.g., T-pipe)) with a first treated exhaust gas outlet 111 and a second treated exhaust gas outlet 112 routing a second portion of the treated exhaust gas to the first end of a first treated EGR line 120.

As shown in FIG. 2, in one embodiment, the pressure in the first treated EGR line 120 is typically less than the pressure in the intake manifold 11 of the engine 10. To address this low pressure and to ensure that the recirculated treated exhaust gas reaches the intake manifold 11 of the engine, in one embodiment, the first treated EGR line 120 passes through a back-flow prevention valve 140 and a first outlet 122 at the second end of the first treated EGR line 120 downstream of the back-flow prevention valve 140 and connects with the engine intake line 60 in a T-connection that may include an engine intake line venturi (or ejector) 130. In one embodiment, the treated EGR line 120 passes through the back-flow prevention valve 140 and also through a second outlet 124 at the second end of the first treated EGR line 120 downstream of the back-flow prevention valve 140 and connects with the pre-turbine EGR line 40 in a T-connection that may include an engine intake line venturi (or ejector) 131. The venturis 130, 131 can include any suitably-sized conduit (as part of the engine air intake line 60 or EGR line 40 and/or the outlets 122, 124 of first treated EGR line 120) containing a constriction or region of reduced cross-sectional area. Fluid velocity through the constriction increases while pressure decreases, therein creating a partial vacuum via the Bernoulli Effect. Locating the venturis 130, 131 at the downstream end of the first treated EGR line 120 where it connects to the engine air intake line 60 and the pre-turbine EGR line 40 can decrease fluid pressure at that point. The reduced pressure at the downstream end of the first treated EGR line 120 can provide a pressure drop across the first treated EGR line 120 sufficient to force a flow of treated exhaust gas through the first treated EGR line 120 and to the intake manifold 11 of the engine 10. It will be understood that while the intake line (throttle) valve 61 is shown upstream of the venturi 130, in another embodiment, the intake line (throttle) valve 61 can be downstream of the venturi 130.

The back flow prevention valve 140 isolates the induction of treated exhaust gas into the current standard pressurized pre-turbine EGR line 40 and/or the turbocharged engine intake line 60 coming from the turbocharger compressor 21 in a manner by which the two sources produce a blended entry into the intake manifold. Transporting treated exhaust gas in the first treated EGR line 120 into engine intake manifold 11 is accomplished by a combination of aspirating gas in addition to pushing gas by the exhaust wave mechanism, produced by combustion stroke exhaust wave. The back flow prevention valve 140 produces a unidirectional gas flow from the engine exhaust manifold 12 to engine intake manifold 11 by taking advantage of oscillating pressures in source and destination lines and restricting back flow toward the first treated exhaust gas outlet 111.

Figure 3:
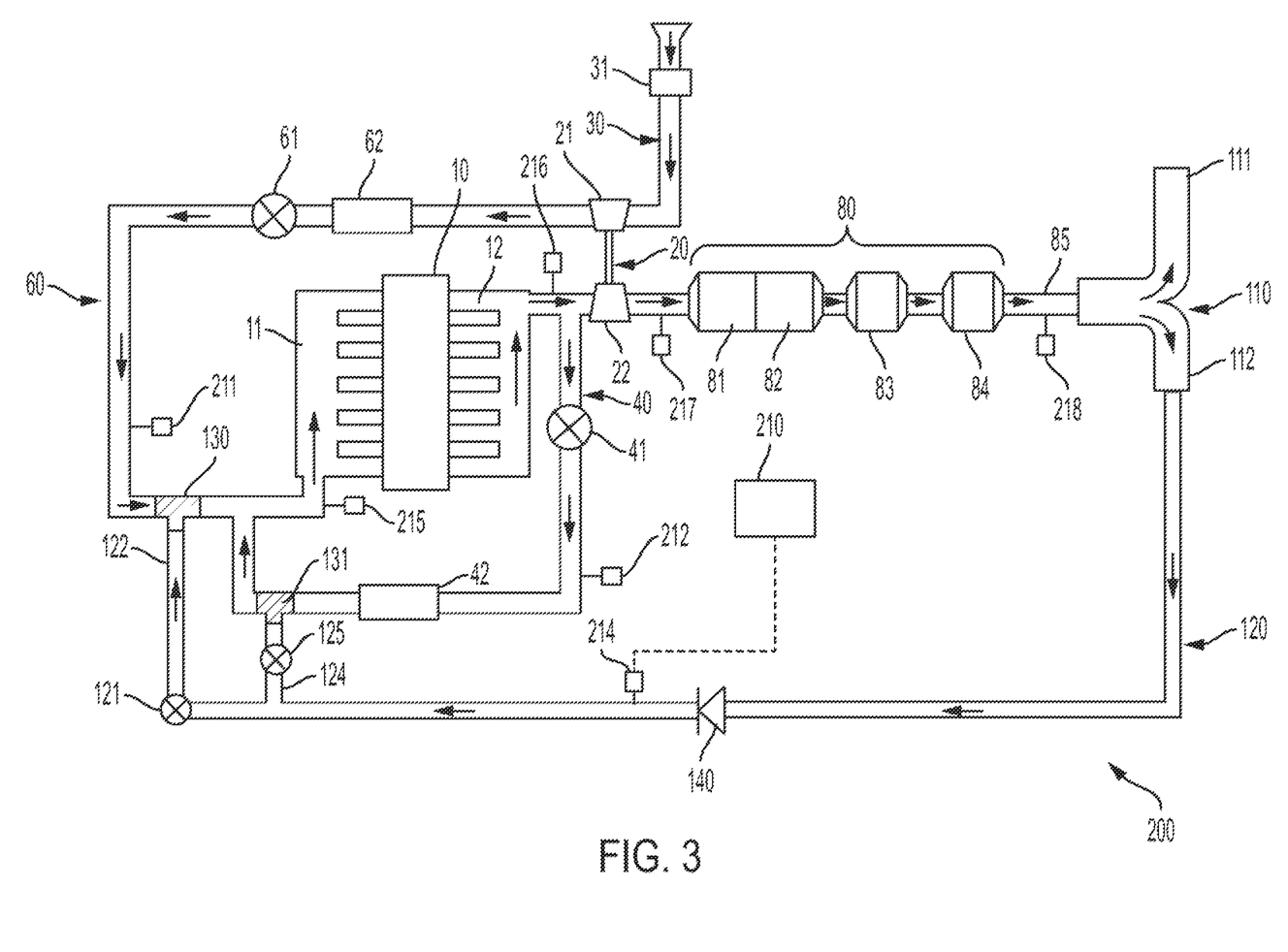
FIG. 3 illustrates a second embodiment of a treated EGR system recirculating treated exhaust gas from a point downstream of the turbine of the turbocharger and the exhaust treatment devices to a point downstream of the compressor of the turbocharger and into the intake manifold of the engine.

As shown in FIG. 3, in a second embodiment of a treated EGR system 200, the first treated EGR line 120 passes through a treated EGR line first outlet valve 121 prior to the first outlet 122 of the first treated EGR line 120. In the second embodiment, the first treated EGR line 120 also passes through a treated EGR line second outlet valve 125 prior to the second outlet 124 of the first treated EGR line 120. In one embodiment, the treated EGR system 200 can include an EGR control module 210 equipped with, e.g., a processor, to monitor various parameters (e.g., pressure, temperature, concentration (e.g., oxygen)) using sensors 211-212, 214-218 and control various system components. For example, venturi inlet line sensor 214 that monitors the treated exhaust gas flowing into the venturis 130, 131 can communicate information to the EGR control module 210 regarding, e.g., power demand change, and concentration of oxygen in the treated exhaust gas such that the EGR control module 210 can then regulate the treated EGR line first outlet valve 121 and treated EGR line second outlet valve 125 (and/or any of the other valves 41, 61) if needed to control NOx and create optimal combustion conditions. Similarly, based on the input of one or more of sensors (e.g., engine intake line sensor 211, pre-turbine EGR line sensor 212, venturi inlet line sensor 214, intake manifold sensor 215, exhaust manifold sensor 216 (which can sense residual oxygen (O$_2$)), pre-treatment exhaust sensor 217, treated exhaust sensor 218, or any other sensors, the EGR control module 210 can then regulate certain engine operations or exhaust treatment devices 80 if needed to create optimal combustion conditions. It will be understood for clarity, FIG. 3 only shows the connection (e.g., wired or wireless) between the EGR control module 210 and the venturi inlet line sensor 214, but all of the sensors are connected to the EGR control module 210. In one embodiment, the EGR control module 210 can be part of an engine control module, while in other embodiments, it can be a separate module in communication with the engine control module.

Figure 4:
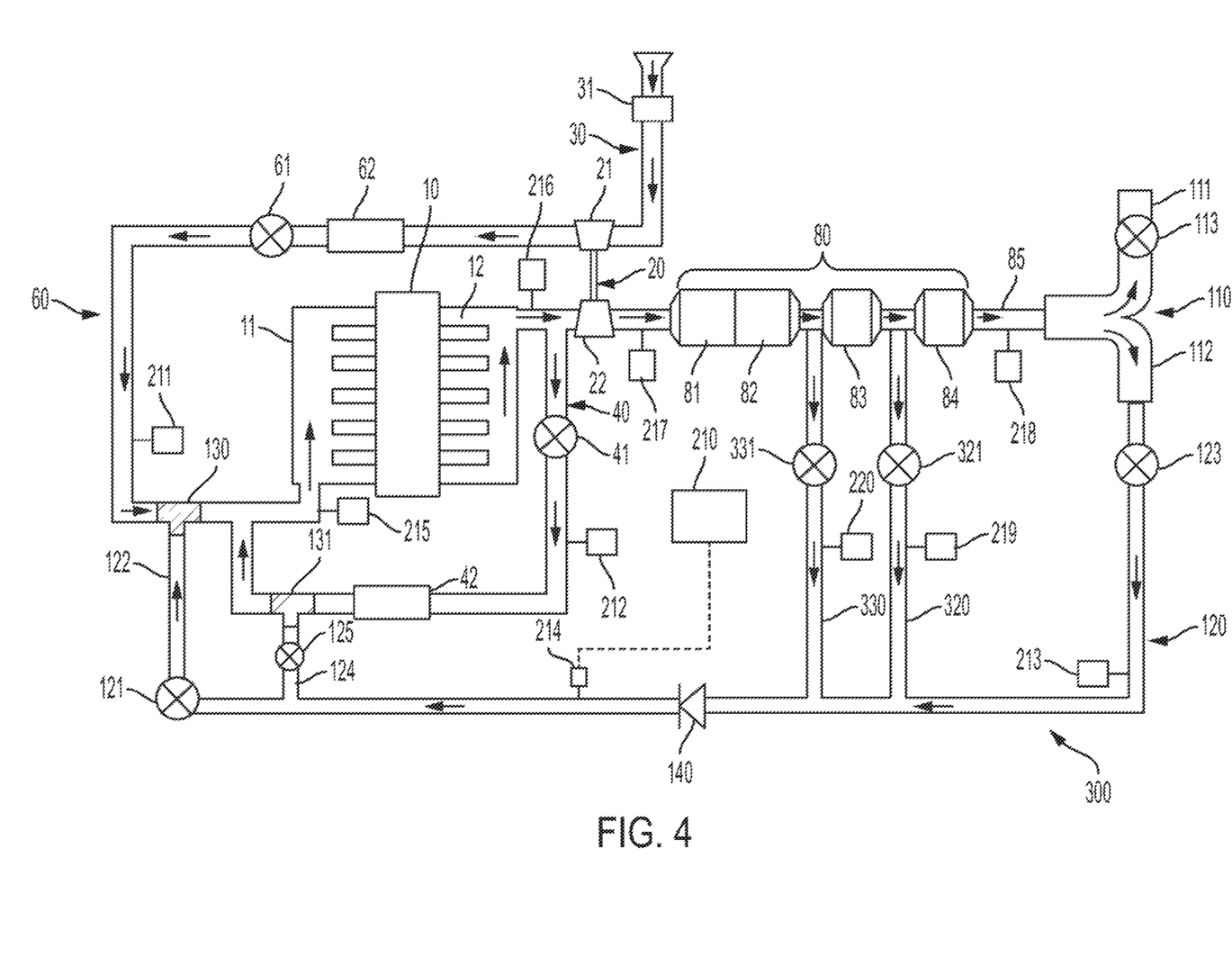
FIG. 4 illustrates a third embodiment of a treated EGR system recirculating treated exhaust gas from one or more points downstream of the turbine of the turbocharger and one or more of the exhaust treatment devices to a point downstream of the compressor of the turbocharger and into the intake manifold of the engine.

FIG. 4 illustrates a third embodiment of a treated EGR system 300 recirculating treated exhaust gas from one or more points downstream of the turbine 22 of the turbocharger 20 and one or more of the exhaust treatment devices 80 to a point downstream of the compressor 21 of the turbocharger 20 and into the intake manifold 11 of the engine 10. It is understood that exhaust treatment devices 80 may be in different order and type. In this third embodiment, the treated EGR system 200 of FIG. 3 has been modified to add two additional treated EGR lines 320, 330 and associated treated EGR line valves 321, 331 and sensors 219, 220. In this embodiment, a second treated EGR line 320 is connected in a T-connection between the last two exhaust treatment devices 80 downstream of the SCR 83 and upstream of the AOC 84. The second treated EGR line 320 passes through a second treated EGR line valve 321 and connects with the first treated EGR line 120 in a T-connection upstream of the back-flow prevention valve 140. In this embodiment, a third treated EGR line 330 is connected in a T-connection downstream of the DPF 82 and upstream of the SCR 83. The third treated EGR line 330 passes through a third treated EGR line valve 331 and connects with the first treated EGR line 120 in a T-connection upstream of the back-flow prevention valve 140. In this embodiment, a first treated EGR line valve 123 and a first treated EGR line sensor 213 can be added in the first treated EGR line 120 upstream of the back-flow prevention valve 140. As explained with respect to the first embodiment described in FIG. 2, since the pressure in each of the treated EGR lines 120, 320, 330 is typically less than the pressure in the intake manifold 11 of the engine 10, the treated EGR lines 120, 320, 330 can be referred to as low pressure EGR loops.

To address this low pressure and to ensure that the recirculated treated exhaust gas reaches the intake manifold 11 of the engine, in one embodiment, the first treated EGR line 120 (to which each of the second treated EGR line 320 and the third treated EGR line 330 are connected upstream of the back-flow prevention valve 140) passes through a back-flow prevention valve 140 and a first outlet 122 of the first treated EGR line 120 downstream of the back-flow prevention valve 140 and connects with the engine intake line 60 in a T-connection that may include an engine intake line venturi (or ejector) 130. In one embodiment, the treated EGR line 120 passes through the back-flow prevention valve 140 and also through a second outlet 124 of the first treated EGR line 120 downstream of the back-flow prevention valve 140 and connects with the pre-turbine EGR line 40 in a T-connection that may include an engine intake line venturi (or ejector) 131. The oscillating pressure in combination with the back flow prevention valve 140 downstream end of the first treated EGR line 120 provides a pressure drop across the treated EGR lines 120, 320, 330 sufficient to force a flow of treated exhaust gas through the treated EGR lines 120, 320, 330 and to the intake manifold 11 of the engine 10.

As shown in FIG. 4, the treated EGR system 300 can include a first treated EGR line sensor 213 for monitoring the treated exhaust gas flowing through the first treated EGR line 120, a second treated EGR line sensor 219 for monitoring the treated exhaust gas flowing through the second treated EGR line 320, and include a third treated EGR line sensor 220 for monitoring the treated exhaust gas flowing through the third treated EGR line 330. Each of the sensors 213, 214, 219, 220, can be connected to the EGR control module 210 that can then control the valves 113, 121, 123, 125, 321, 331 to provide the ideal mix of intake air through engine intake line 60 and HP EGR line 40 from recirculated treated exhaust gas through treated EGR lines 120, 320, 330.

It will be understood that, although the treated EGR systems 100, 200, 300 disclosed in FIGS. 2-4 included the prior art recirculation of untreated exhaust gas through pre-turbine EGR line 40 to the intake manifold 11 of the engine 10 as shown in FIG. 1, in other embodiments, the prior art recirculation of untreated exhaust gas can be eliminated. This would provide the benefit of avoiding recirculation of untreated exhaust gas that often includes high amounts of PM (soot) and contaminates that can cause wear on engine parts, while still sufficiently reducing NOx emissions.

Figure 5:
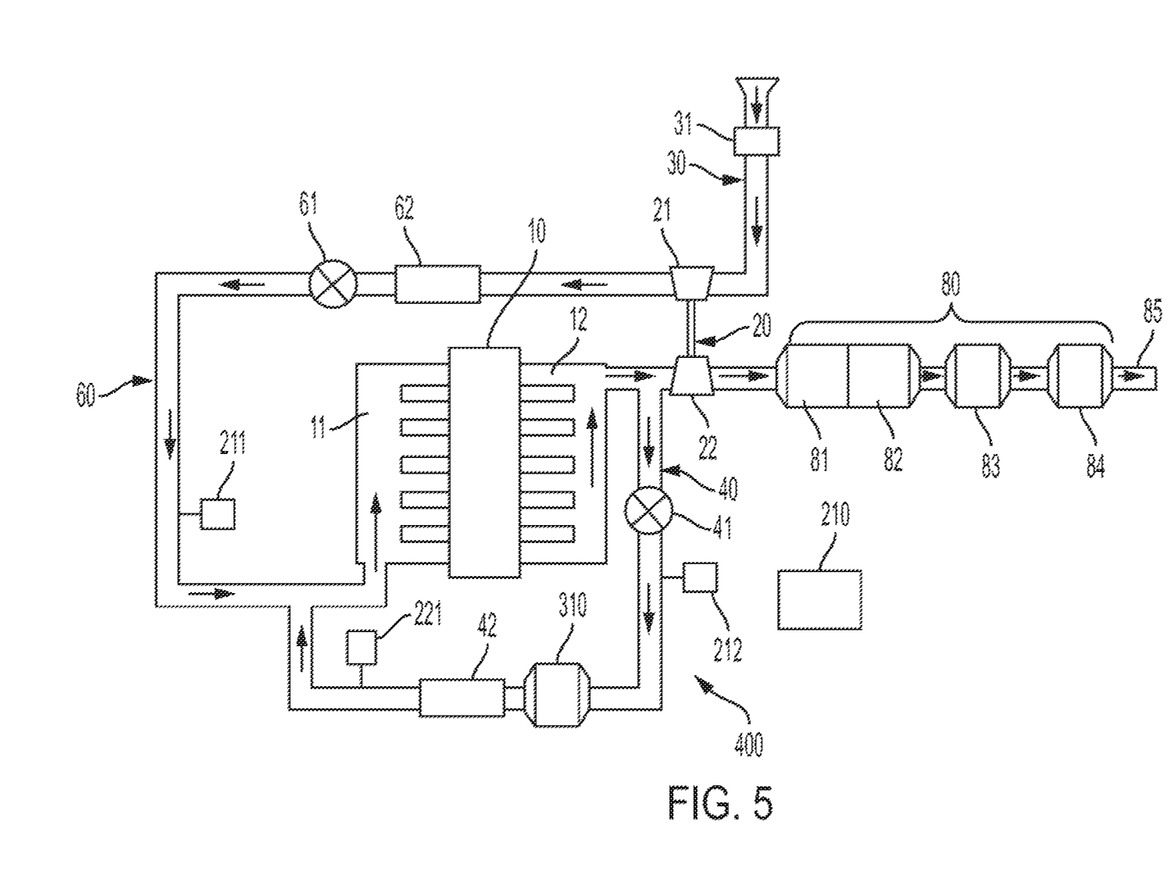
FIG. 5 illustrates a fourth embodiment of a treated EGR system recirculating exhaust gas from a point upstream of the turbine of the turbocharger through one or more exhaust treatment devices and into the intake manifold of the engine.

While the treated EGR systems 100, 200, 300 disclosed in FIGS. 2-4 included treated EGR lines 120, 320, 330 recirculating treated exhaust gas from one or more points downstream of the turbine 22 of the turbocharger 20 and the exhaust treatment devices 80, FIG. 5 illustrates a fourth embodiment of a treated EGR system 400 recirculating exhaust gas from a point upstream of the turbine 22 of the turbocharger 20 through one or more exhaust treatment devices 310 (including catalysts and/or filters) and into the intake manifold 11 of the engine 10. Before the exhaust gas exiting the exhaust manifold 12 of the engine 10 reaches the inlet of the turbine 22 of the turbocharger 20 (i.e., is still upstream of the turbine 22), a first portion of the exhaust gas flows back through a pre-turbine EGR line 40 through a pre-turbine EGR line valve 41 and a pre-turbine EGR line cooler 42 to the intake manifold 11 of the engine 10. For example, the pre-turbine EGR line 40 can connect with the engine intake line 60 in a T-connection. Since the pressure in the exhaust manifold 12 of the engine 10 and the pre-turbine HP EGR line 40 upstream of the turbine 22 of the turbocharger 20 is typically greater than the pressure in the intake manifold 11 of the engine 10, the pre-turbine EGR system 400 can be referred to as a high pressure (HP) loop.

As shown in FIG. 5, the treated EGR system 400 can include a treated exhaust sensor 221 located downstream of the one or more exhaust treatment devices 310 for monitoring the treated exhaust gas flowing from the exhaust treatment devices 310. The treated exhaust sensor 221 can be connected to the EGR control module 210 that can then control the valve 41 and provide the ideal mix of intake air through engine intake line 60.

It will be understood that, although the treated EGR systems 100, 200, 300, 400 disclosed in FIGS. 2-5 were disclosed without the use of the prior art EGR system 1 shown in FIG. 1, the treated EGR systems 100, 200, 300 could also be used in conjunction with that conventional system 1, e.g., in a retrofit application. Similarly, although the treated EGR systems 100, 200, 300 disclosed in FIGS. 2-4 did not include the treated EGR system 400 disclosed in FIG. 5, it will be understood that all or a portion of these EGR systems 100, 200, 300, 400 can be used in conjunction with each other.

As can be seen in FIG. 2-5, the treated exhaust gas in each treated EGR system 100, 200, 300, 400 is recirculated to the engine intake line 60 and mixed with the fresh air intake at a point downstream of the compressor 21 of the turbocharger 20 and the engine intake line cooler 62. The constituents in the treated exhaust gas are recirculated to the engine intake manifold 11 in a manner that preserves the activity of the desired constituents in the treated exhaust gas to enhance performance in engine 10.

In order to enhance engine performance based on this discovery, it will be understood that using catalysts in exhaust treatment devices 80, 310 to produce these desirable constituents will improve engine performance when these disclosed treated EGR systems 100, 200, 300, 400 are employed. For example, the applicants have discovered that recirculating the treated exhaust gas in this manner preserves the activity of the unstable ROS constituents in the treated exhaust gas which then enhance combustion to a greater extent than diatomic oxygen from air. The activity of the ROS constituents are preserved when not compressed or aggressively cooled. In addition, by designing the treated EGR lines 120, 320, 330 (e.g., conduits) in a manner that minimizes interactions between the constituents in the treated exhaust gas themselves and with the treated EGR lines 120, 320, 330 themselves, the reactive state of the ROS constituents are preserved until they reach the intake manifold 11 of the engine 10. It is assumed that one or more of these treated EGR lines 120, 320, 330 can be used in conjunction.

Different embodiments include different approaches for controlling the rate of treated recirculation in the engine 10. The first approach is self-calibration of the engine 10 through the engine intake draw demand and exhaust wave effects. As these two parameters increase, the engine will aspirate appropriately, in essence controlling the amount of treated exhaust needed, as a result of increased RPM and combustion power. As the load increases, treated recirculated gas increases, but as the load decreases during idle the treated recirculated gas decreases. Through application of the self-calibration approach, the engine can be calibrated with the introduction of recirculated moisture and treated exhaust gas. Recirculated moisture offers beneficial cooling of the combustion process, while the recirculated ROS enhances combustion.

A second approach to controlling the rate of treated exhaust gas in the engine 10, is by computer control of module 210. The rate of recirculation of the treated exhaust gas can be governed, by the control module 210, which uses inputs from various sensors to control valves 41, 61, 113, 121, 125, 123, 321, 331. To determine the quantity of treated ROS gas being recirculated compared to fresh intake air from line 60 requires comparing factors such as engine out NOx to tail pipe NOx, oxygen content at different points in the system, temperatures and pressures that may adversely affect turbo performance, etc. A balance has to be made between emission control, engine combustion efficiency, and over stressing engine components.

The ROS that reach the engine 10 will enhance engine performance and improve combustion efficiency. These benefits include (i) reduction in fuel demand as a function of horsepower demand, improving fuel economy through more efficient combustion; (ii) reduction in $CO_2$ greenhouse gas due to reduced fuel demand; (ii) reduction in oxides of nitrogen (NOx); (iv) reduction in particulate matter because of enhanced combustion; and (v) improved horsepower based on enhanced combustion.

In highway road tests conducted on a heavy-duty diesel vehicle pulling an empty trailer with a NAVISTAR® A26 engine, configured with (i) the prior art HP EGR system FIG. 1 without the low pressure EGR line 50 and (ii) the HP EGR system and retrofitted with the treated exhaust gas system 100 of FIG. 2, the engine performed better by delivering more horsepower, lowering NOx emissions by more than 10% and reducing fuel consumption by at least 5%.

Figure 6:
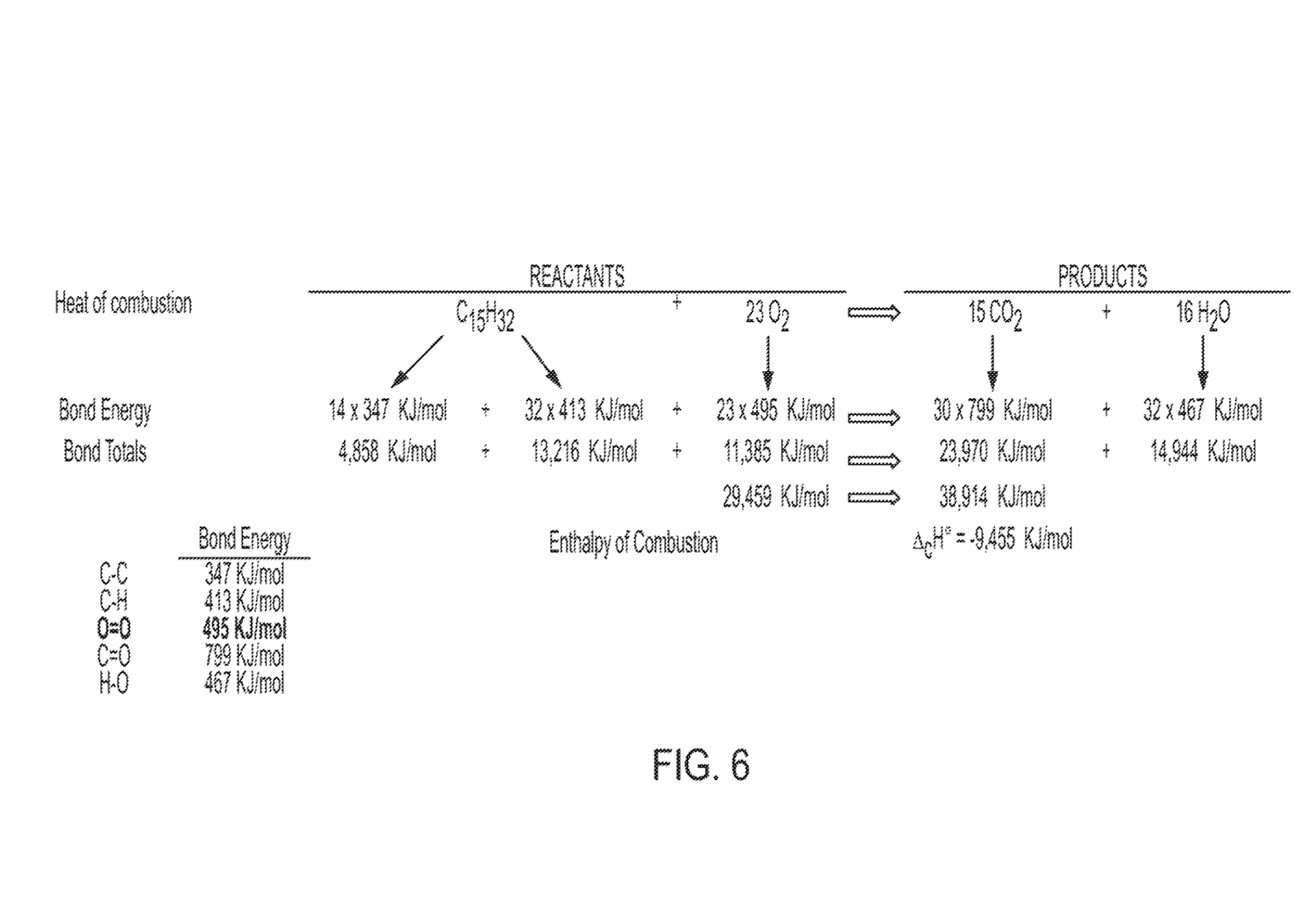
FIG. 6 illustrates the calculations of energy balance in the disclosed treated EGR systems.

FIG. 6 represents the oxidation of a typical diesel fuel molecule ($C_{15}H_{32}$). Stoichiometrically, a mole of diesel fuel ($C_{15}H_{32}$) would require 23 moles of $O_2$ to completely oxidize the molecule into its end products, 15 moles of CO) and 16 moles of $H_2O$. To calculate the enthalpy of combustion, the total bond enthalpy of the reactants (29,459 kJ/mol) is subtracted from the total bond enthalpy of the products (38,914 kJ/mol) to yield −9,455 kJ/mol. This negative energy balance represents an exothermic reaction. This energy is thermodynamically converted to mechanical energy by the resulting expansion of the gas in the cylinder. From the energy calculations in FIG. 6, it can be seen that, although the overall reaction is exothermic, a considerable amount of energy is needed to break the diatomic double bond oxygen (O=O) for the reaction to reach completion. The applicants have discovered that this reaction is expedited when ROS constituents enhance chain reactions. Any oxygen containing molecule that has a lower bond energy (i.e., ROS) that participates in the reaction will result in a higher energy output per unit of fuel. The higher energy output results in better fuel economy. In addition, there are other benefits related to adding ROS to the combustion chamber that relate to intermediary reaction paths or reaction rates of these intermediate reactions. It is known that there are a variety of reactions that affect oxidation rate. Each of these reactions exerts an influence on the overall reaction rate, and is dependent on its own range of conditions. The applicants have discovered that the rate of some of these reactions is expedited when the concentration of ROS constituents are increased. Assuming ROS would increase the reaction rate of intermediary reactions and therefore use oxygen more efficiently, there would be an increase in combustion efficiency.

It will be understood that while the particular embodiments disclosed herein focused on ROS in the treated exhaust gas as one of the reasons for enhanced engine performance, other constituents in the treated exhaust gas (e.g., treated particulate matter, moisture, nitrogen, carbon dioxide, etc.) could also have properties that enhance engine performance and are optimized through the use of the disclosed treated EGR systems. Those implementations are also within the scope of the disclosed EGR systems and methods.

While the present invention has shown and described, with reference to certain exemplary embodiments, it will be understood by one skilled in the art, that various changes in detail may be effected therein, without departing from the spirit and scope of the invention that can be supported by the written description and drawings. Further, where exemplary embodiments are described with reference to a certain number of elements, it will be understood that the exemplary embodiments can be practiced utilizing either less than or more than the certain number of elements.

PARTS LIST

1 EGR system (prior art)
10 internal combustion engine
11 intake manifold
12 exhaust manifold
20 turbocharger
21 compressor
22 turbine
30 air intake line
31 air intake filter
40 pre-turbine EGR line
41 pre-turbine EGR line valve
42 pre-turbine EGR line cooler
50 treated EGR line
51 treated EGR line valve
52 treated EGR line cooler
60 engine intake line
61 engine intake line (throttle) valve
62 engine intake line cooler
70 tailpipe
80 exhaust treatment devices
81 diesel oxidation catalyst (DOC)
82 diesel particulate filter (DPF)
83 selective catalytic reduction catalyst (SCR)
84 ammonia oxidation catalyst (AOC)
85 outlet of exhaust treatment devices
100 treated EGR system (first embodiment)
110 Y-pipe
111 first treated exhaust gas outlet
112 second treated exhaust gas outlet
113 exhaust valve
120 first treated EGR line
121 treated EGR line first outlet valve
122 first outlet of first treated EGR line
123 first treated EGR line valve
124 second outlet of first treated EGR line
125 treated EGR line second outlet valve
130 engine intake line venturi
131 pre-turbine EGR line venturi
140 backflow prevention valve
200 treated EGR system (second embodiment)
210 EGR Control Module
211 engine intake line sensor
212 pre-turbine EGR line sensor
213 first treated EGR line sensor
214 venturi inlet line sensor
215 intake manifold sensor
216 exhaust manifold sensor
217 pre-treatment exhaust sensor
218 treated exhaust sensor
219 second treated EGR line sensor
220 third treated EGR line sensor
221 treated exhaust sensor
300 treated EGR system (third embodiment)
310 exhaust treatment devices
320 second treated EGR line
321 second treated EGR line valve
330 third treated EGR line
331 third treated EGR line valve
400 treated EGR system (fourth embodiment)

The invention claimed is:

1. An exhaust gas recirculation (EGR) system for an internal combustion engine having an exhaust manifold discharging exhaust gas to a turbine of a turbocharger located downstream of the engine and an intake manifold connected to an engine intake line receiving forced air downstream of a compressor of the turbocharger, wherein one or more exhaust treatment devices are located downstream of the turbine tor treating the exhaust gas and producing a treated exhaust gas, the EGR system comprising:

a first treated EGR line with a first end connected to a point downstream of the one or more exhaust treatment devices and a second end connected to the engine intake line downstream of the compressor of the turbocharger;

a back-flow prevention valve located in the first treated EGR line between the first end and the second end of the first treated EGR line; and a pre-turbine EGR line with a first end connected to a point downstream of the exhaust manifold of the engine and upstream of the turbine of the turbocharger and a second end connected to the engine intake line downstream of the compressor of the turbocharger;

wherein the first treated EGR line recirculates the treated exhaust has to the intake manifold of the engine without passing through the compressor, wherein the second end of the first treated EGR line comprises a first outlet connected to the engine intake line, the EGR system further comprising a first venturi located at the connection of the first outlet of the first treated EGR line and the engine intake line; and wherein the second end of the first treated EGR line comprises a second outlet connected to the pre-turbine EGR line, wherein the EGR system further comprises a second venturi located at the connection of the second outlet of the first treated EGR line and the pre-turbine EGR line.

2. The EGR system of claim 1, further comprising a first value located in the first treated EGR line.

3. The EGR system of claim 2, further comprising:
a sensor for monitoring the treated exhaust gas in the first treated EGR line; and
an EGR control module connected to the sensor,
wherein the EGR control module is configured to control the first valve based on the output of the sensor.

* * * * *

UNITED STATES PATENT AND TRADEMARK OFFICE
CERTIFICATE OF CORRECTION

PATENT NO. : 11,708,808 B2
APPLICATION NO. : 17/867145
DATED : July 25, 2023
INVENTOR(S) : John Francis Schickler et al.

Page 1 of 1

It is certified that error appears in the above-identified patent and that said Letters Patent is hereby corrected as shown below:

In the Claims

Claim 1, Column 12 and Line 58 should read "exhaust gas" not exhaust has...

Signed and Sealed this
Sixteenth Day of April, 2024

Katherine Kelly Vidal
Director of the United States Patent and Trademark Office